United States Patent [19]

Markowitz et al.

[11] Patent Number: 5,876,480

[45] Date of Patent: Mar. 2, 1999

[54] SYNTHESIS OF UNAGGLOMERATED METAL NANO-PARTICLES AT MEMBRANE INTERFACES

[75] Inventors: Michael Markowitz, Burke, Va.; Gan Moog Chow, Bowie, Md.; Alok Singh, Springfield, Va.

[73] Assignee: The United States of America as represented by the Secretary of the Navy, Washington, D.C.

[21] Appl. No.: 603,296

[22] Filed: Feb. 20, 1996

[51] Int. Cl.$^6$ ........................................ A61K 9/14
[52] U.S. Cl. .................. 75/252; 75/253; 75/370; 75/723; 424/450; 424/489; 428/402; 428/402.2
[58] Field of Search ................. 424/450, 489; 428/402.2, 402; 75/252, 253, 254, 255, 370, 723

[56] References Cited

U.S. PATENT DOCUMENTS

| | | | |
|---|---|---|---|
| 4,806,489 | 2/1989 | Beach | 75/252 |
| 5,403,375 | 4/1995 | Konig et al. | 75/255 |
| 5,407,458 | 4/1995 | Konig et al. | 75/255 |
| 5,466,467 | 11/1995 | Singh | 424/450 |
| 5,521,289 | 5/1996 | Hainfeld et al. | 530/391.5 |
| 5,523,006 | 6/1996 | Strumban | 75/255 |

OTHER PUBLICATIONS

Michael Markowitz, Gan–Moog Chow & Alok Singh, Polymerized Phospholipid Membrane Mediated Synthesis of Metal Nanoparticles, Langmuir, Nov. 1994, pp. 4095–4102.
A. Singh, M. Markowitz, and G.M. Chow, Materials Fabrication via Polymerizable Self–Organized Membranes: An Overview, NanoStructured Materials, vol. 5, No. 2, pp. 141–153 (1995).
Copy of Letter from Doug Cherno working for publisher of NanoStructured Materials. Letter dated Feb. 20, 1996 indicates that cited reference "AS" (on this PTO Form 1449) was, according to the records of Elsevier Science, mailed out by their printer on Feb. 23, 1995.

Primary Examiner—George Wyszomierski
Attorney, Agent, or Firm—Thomas E. McDonnell; Ralph T. Webb

[57] ABSTRACT

The present invention relates to a powder of unagglomerated metallic particles. More particularly, the present invention relates to a powder of unagglomerated metallic particles having an average diameter of about 1–100 nm and the process for making the same. Additionally, the powder of unagglomerated metallic particles can be formed into a lyophilized form which upon reconstitution maintains the average diameter of between about 1–100 nm wherein the particles remain unagglomerated.

11 Claims, 2 Drawing Sheets

5,876,480

SYNTHESIS OF UNAGGLOMERATED METAL NANO-PARTICLES AT MEMBRANE INTERFACES

BACKGROUND OF THE INVENTION

1. Field of the Invention

The present invention relates to a powder of unagglomerated metallic particles. More particularly, the present invention relates to a powder of unagglomerated metallic particles having an average diameter of about 1–100 nm and the process for making the same. Additionally, the powder of unagglomerated metallic particles can be formed into a lyophilized form which upon reconstitution maintains the average diameter of between about 1–100 nm wherein the particles remain unagglomerated.

2. Description of the Related Art

Nanoscale (particle diameter of 1–100 nm) metallic particles are important components in the development of catalytic, sensor, aerosol, filter, biomedical, magnetic, dielectric, optical, electronic, structural, ceramic and metallurgical applications. Nanoscale metallic particles exhibit volume and surface effects which are absent in the same material with dimensions in the micron range (i.e. 0.1 micron<particle diameter <1 micron).

Metallic nano-particles using polymerized phospholipid membranes of phosphatidylcholines and mixtures of phosphatidylcholines and phosphatidylhydroxyalkanols have been reported. See Markowitz et al., Polymerized Phospholipid Membrane Mediated Synthesis of Metal Nanoparticles, Langmuir, pp. 4095–4102, (November 1994), incorporated herein by reference in its entirety and for all purposes. The use of polymerized vesicles as templates for the synthesis of unagglomerated particles presents several difficulties. For example, the use of polymerized vesicles (as templates for the synthesis of unagglomerated nanoparticles) involves the diffusion of reactants across the polymerized membrane. Thus, such polymerized vesicles limit the process of forming unagglomerated nanoparticles to only those reactants which can cross the polymerized vesicle membrane.

In addition, such unpolymerized vesicles are relatively unstable to the asymmetric addition of high concentrations of bivalent ions (e.g. metal ions). Thus, a process wherein unpolymerized vesicles are used for the formation of size controlled unagglomerated nanoparticles is desired. The advantages of using nonpolymerized vesicles (as templates for the formation of metallic nanoparticles of between about 1–100 nm) are several including:

(i) self-assembly of vesicles in the appropriate solvent;
(ii) a simplified process for the production of metallic nanoparticles;
(iii) a more cost effective process for the production of metallic nanoparticles; and
(iv) metallic nanoparticles readily redisperse upon hydration after lyophilization.

SUMMARY OF THE INVENTION

It is therefore an object of the present invention to form metallic nanoparticles using unpolymerized vesicles as templates for the formation of the metallic nanoparticles.

It is therefore another object of the present invention to develop a process wherein metallic nanoparticles are formed using unpolymerized vesicles as templates for the formation of the metallic nanoparticles.

It is therefore yet another object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between about 1–100 nm.

It is therefore even yet another object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between 1–100 nm.

It is therefore a further object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between about 2–40 nm.

It is therefore an even further object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between about 3–30 nm.

It is still a further object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between about 4–20 nm.

It is still an even further object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between about 5–10 nm.

It is still another object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between about 1–10 nm.

It is even still another object of the present invention to form a lyophilized form of the metallic nanoparticles using unpolymerized vesicles as templates for the formation of the metallic nanoparticles wherein upon hydration of the lyophilized form the metallic particles are redispersed maintaining a size distribution between 1–10 nm.

It is another object of the present invention to form metallic nanoparticles by a more cost effective process than by the use of polymerized vesicles.

These and other objects are accomplished by the following process:

A process for making a powder containing metallic particles, said process comprising the steps of:

(1) forming a first dispersion of surfactant vesicles in the presence of catalytic first metal ions at a first concentration, said surfactant being lipid A or a mixture of lipid A and lipid B at a ratio of lipid A: lipid B, said lipid A having the structure (A):

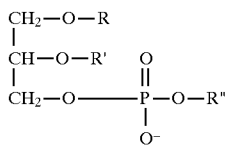

said lipid B having the structure (B):

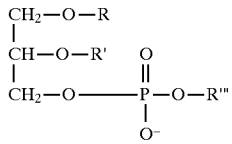

wherein R, R', R" and R'" are selected from the group consisting of saturated aliphatic, unsaturated aliphatic, haloaliphatic, aromatic, haloaromatic compounds and mixtures thereof, wherein R'" further comprises a positively charged group, said first concentration being not more than about a stoichiometrically sufficient concentration to bind to said lipid (A), said first dispersion having a pH;

(2) forming a second dispersion by controlling said pH of said first dispersion to between about 5–7;

(3) forming a third dispersion by mixing a metallization bath containing second metal ions with said second dispersion; and (4) forming a fourth dispersion by incubating said third dispersion at a temperature sufficient to reduce said second metal ions to metal particles having an average diameter between about 1–100 nm. Additionally, another step of (5) forming a fifth dispersion by separating said metal particles and said surfactant from said fourth dispersion may be carried out.

BRIEF DESCRIPTION OF THE DRAWINGS

FIG. 1(b) is a higher magnification TEM of the Au nanoparticles depicted in FIG. 1(a). The Au redispersed nanoparticles depicted in FIGS. 1(a) and 1(b) were made according to the procedure of Example 1, infra.

DETAILED DESCRIPTION OF THE PREFERRED EMBODIMENTS

Figure 1A:
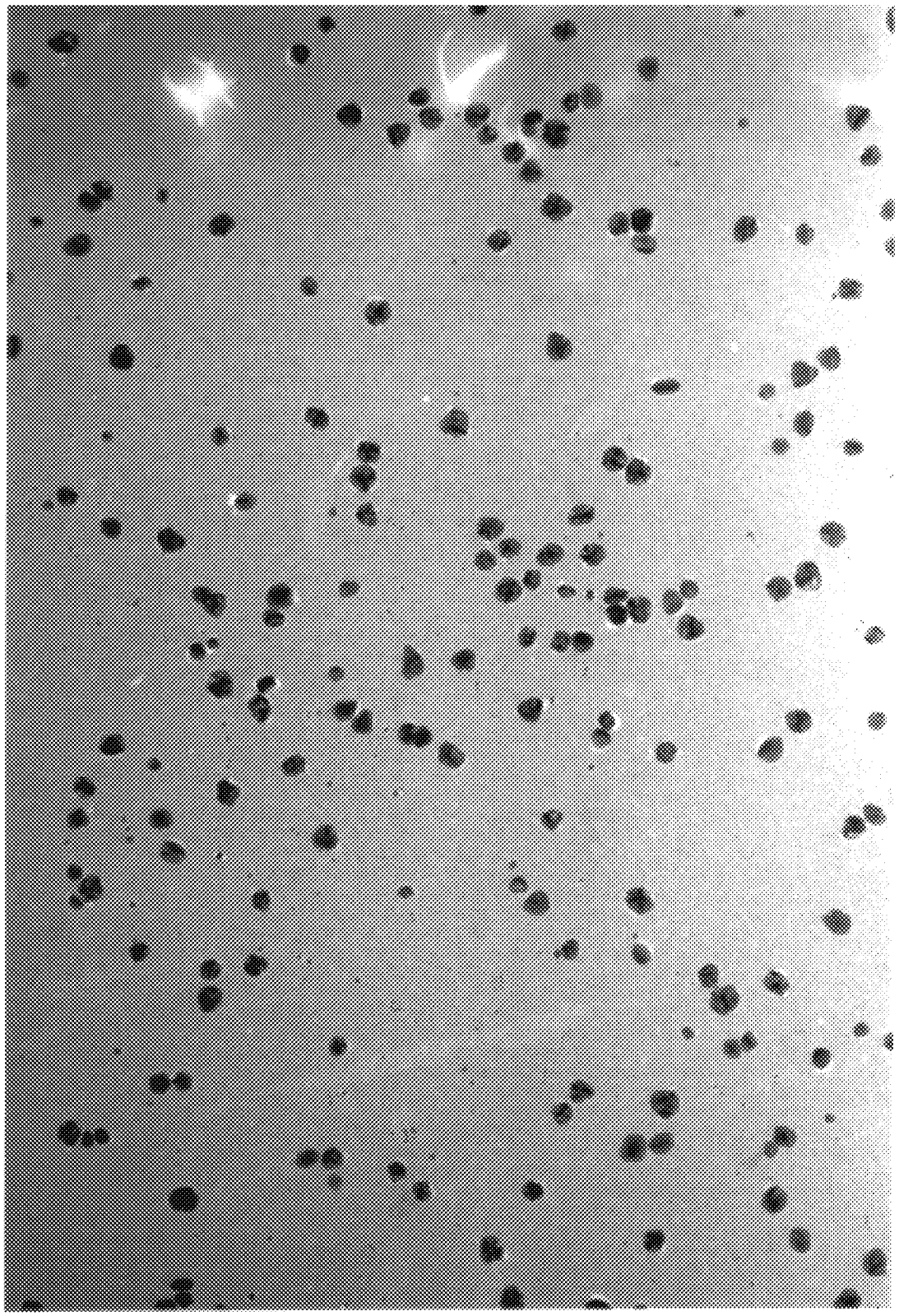
FIGS. 1(a) and 1(b) are transmission electron micrographs (TEM) of redispersed Au nanoparticles having an average diameter between about 18–26 nm.
Figure 1B:
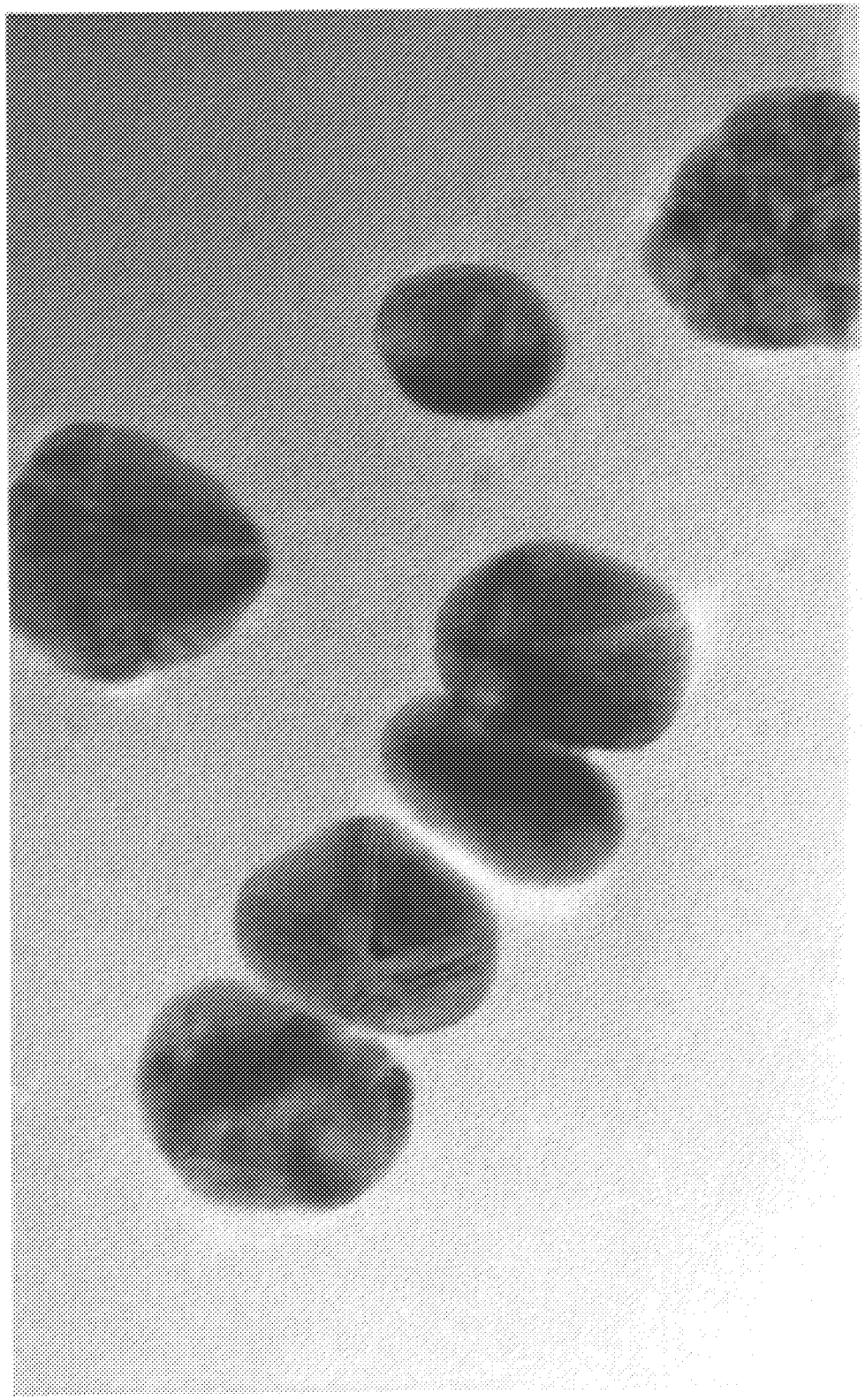

The following detailed description of the preferred embodiment is provided to aid those skilled in the art in practicing the present invention. However, the following detailed description of the preferred embodiment should not be construed to unduly limit the present invention. Variations and modifications in the embodiments discussed may be made by those skilled in the art without departing from the scope of the present inventive discovery.

The role of surfactants with ion binding headgroups is to provide catalytic sites for crystallization and/or electroless deposition/formation of inorganic and organic particles at the membrane interface. Using electroless deposition methods, catalytic first metal ions can be selectively bound to negatively charged surfactants in the presence of uncharged or zwitterionic surfactants. The bound first metal ion can then be used as a catalytic center for electroless metal deposition of second metal ions. Alternatively, simple chemical reduction of the second metal ions can be effected. See Singh et al., Materials Fabrication Via Polymerizable Self-Organized Membranes: An Overview, NanoStructured Materials, Voll. No. 5, No. 2, pp. 141–153 (1995), incorporated herein by reference in its entirety and for all purposes.

Exemplary surfactants that can be used in conjunction with the present invention are shown below. The following lipid A may be used in conjunction with the present invention:

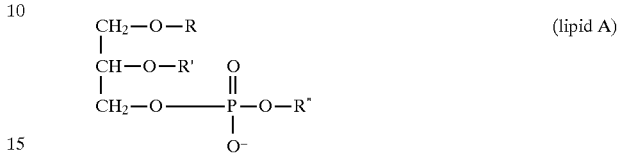
(lipid A)

and a mixture of lipid A and lipid B may be used in conjunction with the present invention to form vesicles, lipid B having the structure:

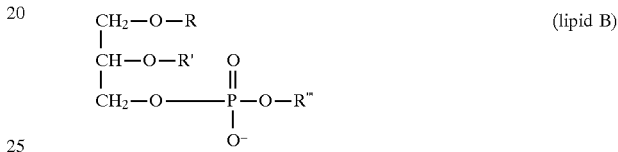
(lipid B)

wherein R, R', R" and R'" are selected from the group consisting of saturated aliphatic, unsaturated aliphatic, haloaliphatic, aromatic, haloaromatic compounds and mixtures thereof, wherein R'" further comprises a positively charged group. More particularly, R, R' and R" may be selected from the group consisting of:

 (1)

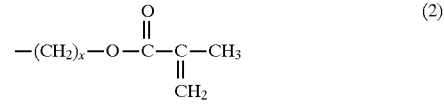 (2)

 (3)

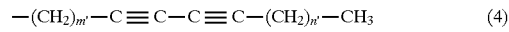 (4)

 (5)

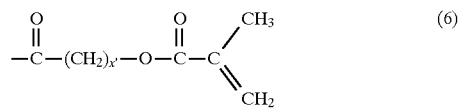 (6)

 (7)

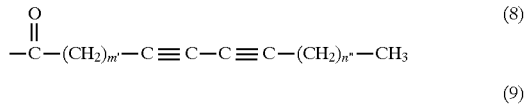 (8)

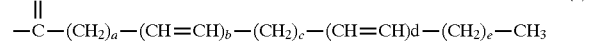 (9)

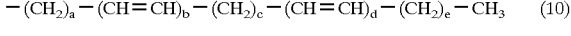 (10)

and mixtures thereof wherein Z is a member selected from the group consisting of a halogen, —H, —OH, —SH, —NH$_2$, or —NHR"", wherein R"" may be aliphatic, substituted aliphatic, olefinic, substituted olefinic, aromatic and substituted aromatic, wherein x, y, y', q" and q' are integers between 0–20, wherein a, b, c, d, and e are integers between 0–20, wherein n' and n" are integers between 1–27, wherein m' is an integer between about 1–28 and wherein 3≦(n'+m')≦29. For example, R"" may be a methyl group. In addition, R'" may have the structure

 (11)

wherein f is an integer between 1–10.

Synthesis of exemplary lipid (A) wherein R=R'=(8), m'=8, n"=9 and R"=(1), y=2 and Z=OH is given in Singh et al., Synth. Commun., Vol. 22, pp. 2293 (1992), incorporated herein by reference in its entirety and for all purposes. See also U.S. Pat. No. 5,466,467, incorporated herein by reference in its entirety and for all purposes.

Synthesis of exemplary lipid (A) wherein R=R'=(8), m'=8, n"=9 and R"=(1), y=0 and Z=H is given in Example 6, infra.

Synthesis of exemplary lipid (B) wherein R or R'=(6), x'=11, R or R'=(7), q"=1–20 (i.e. 1, 2, 3, 4, 5, 6, 7, 8, 9, 10, 11, 12, 13, 14, 15, 16, 17, 18, 19, or 20) and R or R'=(8), m'=2–28 (i.e. 2, 3, 4, 5, 6, 7, 8, 9, 10, 11, 12, 13, 14, 15, 16, 17, 18, 19, 20, 21, 22, 23, 24, 25, 26, 27 or 28), n"=1–27 (i.e. 1, 2, 3, 4, 5, 6, 7, 8, 9, 10, 11, 12, 13, 14, 15, 16, 17, 18, 19, 20, 21, 22, 23, 24, 25, 26, 27) and 3≦(m'+n")≦29 and R'"=(11), f=2 is given in U.S. Pat. No. 5,466,467, previously incorporated herein by reference in its entirety and for all purposes.

To form exemplary bilayer vesicles of unpolymerized surfactant, the exemplary vesicles may be formed entirely or essentially of lipid (A) alone in a polar or aqueous solvent. The solvent may contain catalytic first metal ions. Alternatively, the catalytic metal ions may be added to the lipid (A) dispersion. Exemplary catalytic first metal ions include $Pd^{+2}$, $Au^{+3}$, $Co^{+2}$, $Pt^{+2}$, $Ni^{+2}$, $Rh^{+2}$ and mixtures thereof. A sufficient amount of catalytic first metal ions are added to the exemplary lipid (A) dispersion to bind to the negatively charged phosphate of lipid (A). Typically, not more than about a stoichiometrically sufficient concentration of catalytic first metal ions are added to the lipid (A) dispersion. Thus, if, for example, 10 mmol of lipid (A) is present in the lipid (A) dispersion, then not more than about 10 mmol of the catalytic first metal ions at a suitable concentration are added to the lipid (A) dispersion. Typically, the amount of catalytic first metal ions added to the lipid (A) dispersion is at least about 1% of the moles of lipid (A) present in the exemplary lipid (A) dispersion. The lipid (A) dispersion containing catalytic first metal ions forms an exemplary first dispersion.

For example, a sufficient quantity of lipid (A) is hydrated and dispersed in water at a temperature equal to or above the transition melting temperature of R, R' and R", respectively, of lipid (A) forming the first dispersion. Thereafter, the lipid (A) dispersion (first dispersion—e.g. lipid(A) in dispersed in an exemplary solvent such as water containing catalytic first metal ions) is cooled to room temperature (e.g. about 25° C.). After cooling, the pH of the lipid (A) dispersion (i.e. first dispersion) is adjusted to between about 5–7 forming a pH controlled dispersion of lipid (A)—the second dispersion. For example, the pH of the first dispersion can be controlled to between about 5–7 by dialysis against water (e.g. distilled water).

A metallization bath containing second metal ions is added to the second dispersion forming the third dispersion. The metallization bath contains second metal ions subsequently reduced to metal particles having an average diameter of between about 1–100 nm. Typical second metal ions are ions of metals selected from the group consisting of Group IB, IIB, IIB, IVB, VB, VIB, VIIB, VIII metals and mixtures thereof. More typical second metal ions are ions of metals selected from the group consisting of Au, Ag, Pd, Cu, Rh, Ru, Ni, Co, Pt, Fe, W, Cr, Mn, Ti and mixtures thereof. Typically, addition of second metal ions in an amount exceeding more than ten times the amount of catalytic first metal ions is usually prohibitively expensive. Commonly, between about 1–9 times the amount of catalytic first metal ions is about equal to the amount of second metal ions added to the second dispersion to form the third dispersion. Typically, the catalytic first metal ions and second metal ions are obtained as salts. These salts are typically dissolve in an exemplary aqueous solvent. Exemplary salts used are listed in the Examples, infra. Typically, the concentration of the metallization bath (e.g. second metal ions in an aqueous solvent) containing second metal ions is adjusted such that the volume of the metallization bath is about equal to the volume of the second dispersion. Equal volumes of metallization bath and second dispersion is preferred.

After addition of the metallization bath to the second dispersion, a third dispersion is formed. The third dispersion is incubated at a temperature sufficient to reduce said second metal ions to metal particles having a average diameter between about 1–100 nm. The incubation time is typically between about 5 minutes to about 180 minutes. A fourth dispersion is formed by incubating the third dispersion.

Metallic particles having an average diameter between about 1–100 nm are present in the fourth dispersion. However, narrower average diameter distributions may be obtained such as:

about 1–50 nm;
1–50 nm;
about 2–40 nm;
2–40 nm;
about 3–30 nm;
3–30 nm;
about 4–20 nm;
4–20 nm;
about 5–10 nm;
5–10 nm;
about 1–10 nm; and
1–10 nm.

Preferably, the fifth dispersion is formed by separating the metal particles and surfactant (e.g. lipid (A)) from said fourth dispersion. Separation can be accomplished by various techniques such as dialysis against water, and filtration. A inert or non-reactive 0.2 μm filter is preferred to separate the unagglomerated metal particles of desired diameter size distribution and the surfactant from the fourth dispersion to form the fifth dispersion. Alternatively, dialysis of the fourth dispersion to form the fifth dispersion is equally effective.

In the procedure described above using lipid (A), the same procedure can be carried out using a mixture of lipid (A) and lipid (B) at a molar ratio of lipid A: lipid B in place of lipid (A) alone to form unagglomerated metallic nanoparticles having an average diameter of between about 1–100 nm and all the other size ranges listed above.

Typically, the molar ratio of lipid A : lipid B is between about 0.01–100 More typically, the molar ratio of lipid A : lipid B is between about 0.02–0.6. Most typically, the molar ratio of lipid A : lipid B is between about 0.03–0.3. Preferably, the molar ratio of lipid A : lipid B is between about 0.04–0.2. More preferably, the molar ratio of lipid A : lipid B is between about 0.05–0.111. Most preferably, the molar ratio of lipid A: lipid B is between about 0.111–0.112.

EXAMPLES

Example 1

Gold Nanoparticle Synthesis Via Nonpolymerized Vesicles at 25° C.

500 mg of a 9:1 mixture of lipid (B), R=R'=(8), m'=8, n"=9, R'"=(11), f=2 ($DC_{8,9}PC$) and lipid (A), R=R'=(8), m'=8, n'=9, R"=(1), y=2, Z=—OH (DC$_{8,9}$PEtOH) were dissolved in a minimum amount of CHCl$_3$ and the solvent was evaporated under a stream of N$_2$. The sample was kept under vacuum overnight. Then, 10 mL of water and 1.17 mL of 50 mM aq. Pd(NH$_3$)Cl$_2$ were added and the mixture was hydrated at 70° C. for 2 hrs. The hydrated lipid mixture was then sonicated at 70° C. (Branson sonifier Model 450, cup horn attachment) for 1 hr at which point the dispersion was translucent. The dispersion was cooled to room temperature and then dialyzed overnight against water (2 L). The dispersion was diluted to 25 mL with water (lipid concentration=20 mg/mL). The dispersion was equilibrated at 25° C. and then 25 mL of the gold plating bath was added as indicated below to form the third dispersion.

The exemplary metallization bath consists of 1:1 (by volume) mixtures of C and D.

| | |
|---|---|
| Mixture C: | 100 mM aq. AuCl$_3$ |
| Mixture D: | Solution 1) 5 mL 100 mM Na$_2$H$_2$PO$_2$ |
| | Solution 2) 50 uL 100 mM NaHPO$_4$ diluted to 5 mL |
| | Solution 3) 50 uL 10 mM NaCN diluted to 5 mL |

Solutions 1), 2) and 3) are combined to form mixture D.

The above exemplary third dispersion was allowed to stand at 25° C. for 3 hrs and then the product mixture was dialyzed against water (2 L) overnight and then lyophilized. A portion of the freeze-dried sample was analyzed by X-ray crystallography. Au (111) was detected and the crystallite size calculated from line broadening analysis was 21.5 nm. Another portion of the sample was redispersed in water and examined by TEM and HRTEM. TEM revealed the presence of size controlled, unagglomerated gold nanoparticles (18–26 nm diameter). Thermogravimetric analysis (TGA) revealed that the gold nanoparticles constituted a minimum of about 10% of the total wt. of the lyophilized sample. This example demonstrates that size controlled, unagglomerated gold nanoparticles can be formed using this procedure at 25° C.

EXAMPLE 2

The procedure described in example 1 was repeated at 40° C. The exemplary third dispersion was allowed to stand at 40° C. for 3 hrs and then the product mixture was dialyzed against water (2 L) overnight and then lyophilized. X-ray analysis revealed that Au (111) was formed and line broadening analysis revealed that the average crystallite size was 16.5 nm. TEM of a portion of the sample redispersed in water revealed the formation of gold particles with a wide size distribution. The particles were largely agglomerates of the gold crystallites. This example demonstrates that temperature has a significant effect on the size distribution and state of agglomeration of metal particles formed using this method.

EXAMPLE 3

The procedure described in example 1 was repeated at 10° C. The exemplary third dispersion was allowed to stand at 10° C. for 3 hrs and then the product mixture was dialyzed against water (2 L) overnight and then lyophilized. X-ray analysis revealed that Au (111) was formed and line broadening analysis revealed that the average crystallite size was 19 nm. Attempts to redisperse the sample in water were largely unsuccessful. TEM of the very small portion of the sample which did redisperse in water revealed the formation of large gold particles with consisted of agglomerates of the gold crystallites. This example demonstrates that at 10° C., agglomerated gold particles are formed using this procedure and this lipid mixture.

EXAMPLE 4

The procedure described in example 1 was repeated at 25° C. using a silver plating bath. The above exemplary third dispersion was allowed to stand at 25° C. for 30 minutes and then the product mixture was dialyzed against water (2 L) overnight and then lyophilized.

The metallization bath consisted of the following:

Part E 20 mg/mL (tot. of 50 mg) AgNO$_3$, 20 mg/mL (tot. of 50 mg) NaOH, 120 uL NH$_4$OH dissolved in 2.5 mL water (AgNO$_3$ dissolved in aq. NaOH prior to addition of NH$_4$OH).

Part F 16.0 mg/mL (tot. of 40 mg) glucose and 1.5 mg/mL (tot. of 3.75 mg) potassium tartrate were dissolved in 2.5 mL water. The plating bath consisted of equal volumes of parts E and F.

After dialysis, the plated dispersion was passed through a 0.2 um filter and then freeze-dried. X-ray analysis revealed the presence of crystalline silver. TEM of a portion of the sample redispersed in water revealed the presence of unagglomerated silver nanoparticles (6–26 nm). This example demonstrated that unagglomerated silver nanoparticles can be formed using this procedure.

EXAMPLE 5

The procedure described in example 1 was repeated at 25° C. using a 3:1 mixture of lipid (B), R=R'=(8), m'=8, n"=9, R'"=(11), f=2 (DC$_{8,9}$PC) to lipid (A), R =R'=(8), m'=8, n"=9, R"=(1), y=2, Z=—OH (DC$_{8,9}$PEtOH). X-ray analysis revealed that Au (111) was formed and TEM revealed the presence of unagglomerated gold nanoparticles. This example demonstrated that the lipid ratio can be varied.

EXAMPLE 6

The procedure described in example 1 was repeated using a 9:1 mixture of lipid (B), R=R'=(8), m'=8, n"=9, R'"=(11), f=2 (DC$_{8,9}$PC) and lipid (A), R=R'=(8), m'=8, n"=9, R"=(1),y=0,Z=—H (DC$_{8,9}$PA). X-ray analysis revealed that Au (111) was formed and TEM revealed that unagglomerated gold nanoparticles (4–18 nm) had been formed. This example showed that PA lipids can be substituted for PEtOH lipids using this procedure.

EXAMPLE 7

The procedure described in example 1 was repeated using a 9:1 mixture of lipid (B), R=R'=(7), q"=14, R'"=11, f=2 (DPPC) and lipid (A), R=R'=(7), q"=14, R"=(1), y=2, Z=—OH (DPPEtOH). X-ray analysis revealed that Au (111) was formed and TEM revealed that unagglomerated gold nanoparticles (40–80 nm) had been formed.

EXAMPLE 8

The procedure described in example 1 was repeated using a mixture of 1:9 lipid (A) lipid (B). Lipid (A) (Soy PetOH) having the structure:

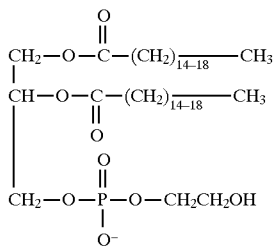

Lipid (B) (Soy PC) having the structure:

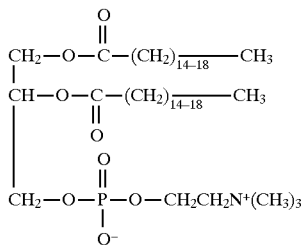

X-ray analysis revealed the presence of au(111) and TEM revealed that unagglomerated gold nanoparticles (0.5–2.0 nm) had been formed.

What is claimed is:

1. An intermediate composition for use in creating unagglomerated metal nano-particles, the intermediate composition comprising a mixture of (1) unpolymerized vesicles, each comprising at least one lipid bilayer membrane, wherein the lipid bilayer membrane comprises lipid A or a combination of lipid A and lipid B, said lipid A having the structure (A):

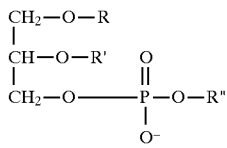

and said lipid B having the structure (B):

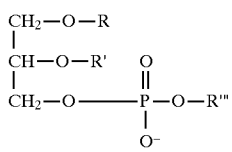

wherein R, R', R" and R'" are selected from the group consisting of saturated aliphatic, unsaturated aliphatic, haloaliphatic, aromatic, haloaromatic groups and combinations thereof, wherein R'" further comprises a positively charged group, and wherein at least some of lipid A has a catalytic first metal ion selected from the group consisting of $Pd^{+2}$, $Au^{+3}$, $Co^{+2}$, $Pt^{+2}$, $Ni^{30\ 2}$, $Rh^{+2}$ and combinations thereof bound thereto by ionic bonding, and (2) a metallization bath including free second metal ions, the second metal ions being ions of metal selected from the group consisting of Group IB, IIB, IIIB, IVB, VB, VIB, VIIB, VIII metals and combinations thereof.

2. The intermediate composition of claim 1 wherein R, R', and R" are selected from the group consisting of:

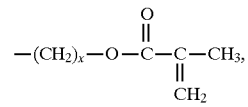
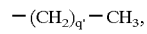
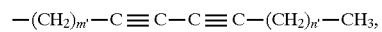
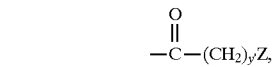
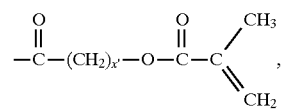
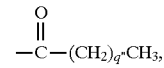
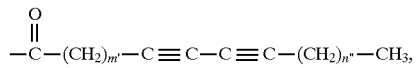
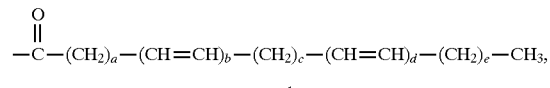

and

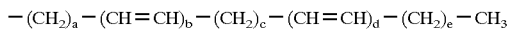

and combinations thereof, wherein Z is a member selected from the group consisting of a halogen, —H, —OH, —SH, —NH$_2$, and —NHR", wherein R"" is selected from the group consisting of aliphatic, substituted aliphatic, olefinic, substituted olefinic, aromatic and substituted aromatic groups, wherein x, y, y', q" and q' are integers between 0–20, wherein a, b, c, d, and e are integers between 0–20, wherein n' and n" are integers between 1–27, wherein m' is an integer between about 1–28 and wherein 3≦(n'+m')≦29 and wherein R'" is represented by the structure

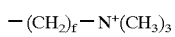

wherein f is an integer between 1–10.

3. The intermediate composition of claim 1 wherein the second metal ions are ions of metals selected from the group consisting of Au, Ag, Pd, Cu, Rh, Ru, Ni, Co, Pt, Fe, W, Cr, Mn, Ti and combinations thereof.

4. A composition comprising a mixture of, (1) unpolymerized vesicles, each comprising at least one lipid bilayer membrane, wherein the lipid bilayer membrane comprises lipid A or a combination of lipid A and lipid B, said lipid A having the structure (A):

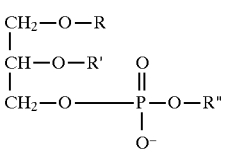

and said lipid B having the structure (B):

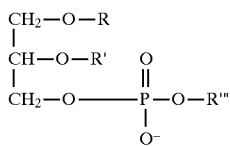

wherein R, R', R" and R'" are selected from the group consisting of saturated aliphatic, unsaturated aliphatic, haloaliphatic, aromatic, haloaromatic compounds and combinations thereof, wherein R'" further comprises a positively charged group, and (2) unagglomerated metal particles having an average diameter between about 0.5 nm and about 100 nm, the unagglomerated metal particles comprising metals selected from the group consisting of the Group IB, IIB, IIIB, IVB, VB, VIB, VIIB, VIII metals and combinations thereof.

5. The composition of claim 4 wherein R, R', and R" are selected from the group consisting of:

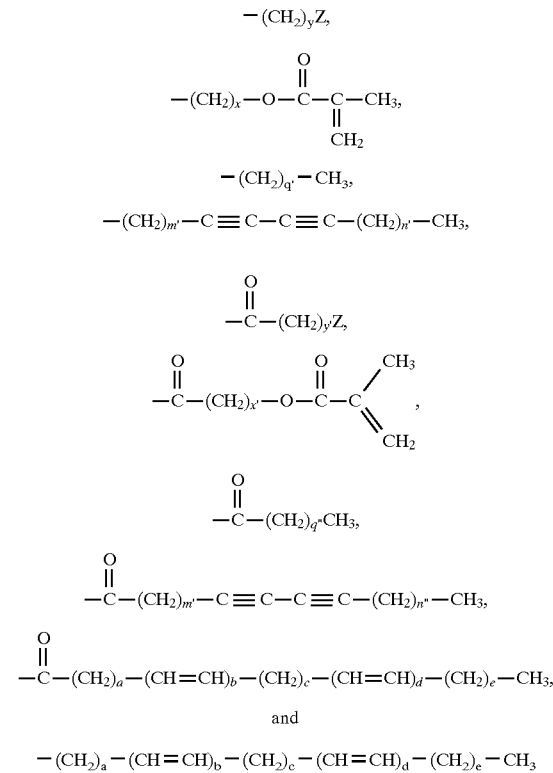

and mixtures thereof, wherein Z is a member selected from the group consisting of a halogen, —H, —OH, —SH, —NH$_2$, and —NHR"", wherein R"" is selected from the group consisting of aliphatic, substituted aliphatic, olefinic, substituted olefinic, aromatic and substituted aromatic groups, wherein x, y, y', q" and q' are integers between 0–20, wherein a, b, c, d, and e are integers between 0–20, wherein n' and n" are integers between 1–27, wherein m' is an integer between about 1–28 and wherein $3 \leq (n'+m') \leq 29$ and wherein R'" is represented by the structure

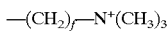

wherein f is an integer between 1–10.

6. The composition of claim 4 wherein the unagglomerated metal particles comprise a metal selected from the group consisting of Au, Ag, Pd, Cu, Rh, Ru, Ni, Co, Pt, Fe, W, Cr, Mn, Ti and combinations thereof.

7. An intermediate composition for use in creating unagglomerated metal nano-particles, wherein the intermediate composition is formed by a process comprising the steps of (1) forming a first dispersion by combining, in a polar or aqueous solvent, catalytic first metal ions, wherein said catalytic first metal ions are selected from the group consisting of $Pd^{+2}$, $Au^{+3}$, $Co^{+2}$, $Pt^{+2}$, $Ni^{+2}$, $Rh^{+2}$ and combinations thereof, with unpolymerized vesicles, each comprising at least one lipid bilayer membrane, wherein the lipid bilayer membrane comprises lipid A or a combination of lipid A and lipid B said lipid A having the structure (A):

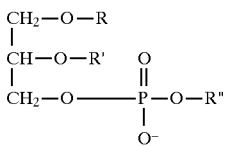

and said lipid B having the structure (B):

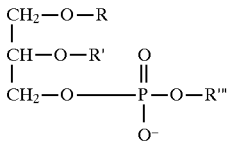

wherein R, R', R" and R'" are selected from the group consisting of saturated aliphatic, unsaturated aliphatic, haloaliphatic, aromatic, haloaromatic groups and mixtures thereof, wherein R'" further comprises a positively charged group, whereby the catalytic first metal ion binds to lipid A by ionic bonding, (2) forming a second dispersion by controlling the pH of said first dispersion to between about 5–7;

(3) forming the intermediate composition by mixing the second dispersion with a metallization bath containing free second metal ions, the second metal ions being ions of metal selected from the group consisting of Group IB, IIB, IIIB, IVB, VB, VIB, VIIB, VIII metals and combinations thereof.

8. A composition formed by a process comprising the steps of (1) forming a first dispersion by combining, in a polar or aqueous solvent, catalytic first metal ions, wherein said catalytic first metal ions are selected from the group consisting of $Pd^{+2}$, $Au^{+3}$, $Co^{+2}$, $Pt^{+2}$, $Ni^{+2}$, $Rh^{+2}$ and combinations thereof, with unpolymerized vesicles, each comprising at least one lipid bilayer membrane, wherein the lipid bilayer membrane comprises lipid A or a combination of lipid A and lipid B said lipid A having the structure (A):

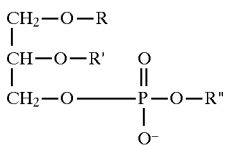

and said lipid B having the structure (B):

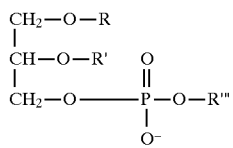

wherein R, R', R" and R'" are selected from the group consisting of saturated aliphatic, unsaturated aliphatic, haloaliphatic, aromatic, haloaromatic groups and mixtures thereof, wherein R'" further comprises a positively charged group, whereby the catalytic first metal ion binds to lipid A by ionic bonding, (2) forming a second dispersion by controlling the pH of said first dispersion to between about 5–7;

(3) forming a third dispersion by mixing the second dispersion with a metallization bath containing free second metal ions, the second metal ions being ions of metal selected from the group consisting of Group IB, IIB, IIIB, IVB, VB, VIB, VIIB, VIII metals and combinations thereof, (4) forming a fourth dispersion by incubating said third dispersion at a temperature sufficient to reduce said second metal ions to metal particles having an average diameter between about 1–100 nm.

9. A composition formed by the process of claim 8 wherein the process further comprises the step of:

(5) forming a fifth dispersion by separating the metal particles and the unpolymerized vesicles from said fourth dispersion.

10. A composition formed by the process of claim 9 wherein the process further comprises the step of:

(6) freeze drying the fifth dispersion to form a powder.

11. The process of claim 8 wherein said step (2) further comprises the substep of:

dialyzing said first dispersion.

* * * * *